United States Patent [19]

Messing et al.

[11] Patent Number: 4,809,721
[45] Date of Patent: Mar. 7, 1989

[54] APPARATUS FOR CLEANING THE SIDEVIEW MIRROR OF A VEHICLE IN A WASHING LINE

[75] Inventors: Horst Messing, Lindlar, Fed. Rep. of Germany; Joseph Enning, Charlottesville, Va.

[73] Assignee: Mr. Wash Auto-Service Aktiengesellschaft, Düsseldorf, Fed. Rep. of Germany

[21] Appl. No.: 103,493

[22] Filed: Oct. 1, 1987

[30] Foreign Application Priority Data

Oct. 2, 1986 [DE] Fed. Rep. of Germany ....... 3633567

[51] Int. Cl.4 .............................................. B08B 3/02
[52] U.S. Cl. .................... 134/57 R; 134/45; 134/123
[58] Field of Search ................ 15/321, 250 R, 250 B; 134/45, 72, 102, 123, 57 R

[56] References Cited

U.S. PATENT DOCUMENTS

| | | | |
|---|---|---|---|
| 2,732,846 | 1/1956 | Brezny | 134/45 |
| 3,339,565 | 9/1967 | Williams | 134/123 X |
| 3,701,356 | 10/1972 | Hanna et al. | 134/123 X |
| 3,968,537 | 7/1976 | Wagenhofer | 15/250 B |
| 4,178,048 | 12/1979 | Gougollas | 15/97 B |
| 4,562,848 | 1/1986 | Messing et al. | 134/123 |
| 4,716,916 | 1/1988 | Hodge | 134/123 |

FOREIGN PATENT DOCUMENTS

56-13241 2/1981 Japan ................... 15/250 B

Primary Examiner—Harvey C. Hornsby
Assistant Examiner—Frankie L. Stinson
Attorney, Agent, or Firm—Becker & Becker, Inc.

[57] ABSTRACT

An apparatus for cleaning the sideview mirror or mirrors of a vehicle in a washing line. A cleaning mechanism, such as a spray nozzle or drying nozzle holder, that essentially extends in a vertical direction is disposed to the side of a vehicle. The sides of the vehicle, along with the sideview mirror or mirrors thereof, are conveyed to pass along the cleaning mechanism. In order to improve cleaning of the sideview mirrors, a mirror-cleaning element, such as a spray nozzle element or a drying nozzle element, is disposed on the cleaning mechanism and is directed in the transport direction of the vehicle. This mirror-cleaning element can be a follower element by being mounted on a lever arm.

18 Claims, 7 Drawing Sheets

APPARATUS FOR CLEANING THE SIDEVIEW MIRROR OF A VEHICLE IN A WASHING LINE

BACKGROUND OF THE INVENTION

The present invention relates to an apparatus for cleaning (i.e. washing or drying) the sideview mirror of a vehicle in a washing line, including, to the side, a cleaning mechanism (e.g. a spray nozzle or drying nozzle holder) that essentially extends in a vertical direction, with the sides of the vehicle, along with the sideview mirror or mirrors thereof, being conveyed to pass along the cleaning mechanism.

There are basically two different systems for automatic car washes. There are the so-called portal washes, where the vehicle that is to be washed remains stationary and the cleaning elements, such as washing brushes and drying nozzles, which are disposed on a portal, are conveyed to pass along the vehicle. There are also the so-called washing lines, where the vehicle is pulled through the wash via a transport means; in this case, the washing devices are disposed stationarily along the direction of movement of the vehicle.

With the last-mentioned washing lines (and also with the portal washes), the cleaning of the sideview mirror or mirrors of a vehicle causes difficulties. Vertically disposed cleaning elements are used to wash the sides of the vehicle as it passes by, and hence also to wash the sideview mirror. Such cleaning elements, which are stationarily disposed on both sides of the washing line, can be spray nozzle holders or drying nozzle holders. The actual washing process is effected with the spray nozzle holders by spraying water under high pressure through nozzles and onto the sides of the vehicle After the washing process, the drying process is effected via the dry nozzle holder by guiding air onto the sides of the vehicle.

The direction of the streams from these cleaning elements is essentially transverse or at right angles to the transport direction of the vehicle, so that the sides of the vehicle are supplied with water or air in a direction that is essentially perpendicular or at most slightly angled relative thereto. This direction is optimal for the side portions of the body of the vehicle. However, this direction is not optimal for the sideview mirrors, the reflector or mirror surfaces of which form an acute angle with the side door of the vehicle, so that if water or air is directed at right angles against the side portions of the vehicle body by the cleaning elements, the mirror surface lies in the "shadow" of the stream of water or air. It is thus not possible to achieve a direct cleaning of the mirror surface with such a cleaning device. Cleaning is effected, if at all, by reflected spray water. Furthermore, the "dead angle" of the sideview mirror is not accessible, so that relative hereto it is not possible to obtain a thorough cleaning.

It is therefore an object of the present invention to improve the cleaning of the sideview mirror or mirrors of a vehicle in a washing line.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The cleaning apparatus of the present invention is characterized primarily by a mirror-cleaning element (for example a spray nozzle element or a drying nozzle element) that is disposed on the cleaning mechanism (i.e. the spray nozzle or drying nozzle holder) and is directed in the transport direction of the vehicle.

This mirror-cleaning element has the advantage that in particular the mirror surface of the sideview mirror undergoes an optimum cleaning. By directing the mirror-cleaning element in the transport direction of the vehicle, a stream-direction component results that is also in the transport direction of the vehicle, so that the mirror surface of the sideview mirror directly receives the appropriate cleaning medium. For the actual cleaning process, the mirror-cleaning element can be a spray nozzle element, in conformity with the spray nozzle holder of the lateral cleaning element, to wash the sides of the vehicle. With this spray nozzle element, water under high pressure can be directed against the mirror surface of the sideview mirror, resulting in a very thorough cleaning. The term "mirror-cleaning element" also includes a drying nozzle element that, after the actual washing process with the spray nozzle element, undertakes the drying. Since with this drying nozzle element air is also directed against the mirror surface of the sideview mirror, a fully satisfactory drying is assured without the danger existing that water residue might collect in the various recesses of the sideview mirror and then drip down after the drying process. Should the washing line include further devices that, among other things, also serve for the cleaning of the sideview mirror, these devices can also be embodied in conformity with the cleaning elements of the present invention. Furthermore, the mirror-cleaning elements also reach the "dead angles", so that these can also be optimally cleaned.

The mirror-cleaning element, in the transport direction of the vehicle, is preferably directed at an angle relative to the sides of the vehicle in the angular region between these sides and the sideview mirror. As a result of this arrangement of the mirror-cleaning element, the cleaning mechanism can pass the sides of the vehicle at a relatively great distance without the effectiveness of the mirror-cleaning element being sacrificed, since due to the inclined orientation, the sideview mirror is disposed in the effective region of the mirror-cleaning element.

Pursuant to one inventive embodiment, the mirror-cleaning element can be rigidly disposed on the cleaning mechanism. In this way, the mirror-cleaning element can be installed without significant additional outlay. However, with this embodiment the sideview mirror is in the effective range of the mirror-cleaning element for only a relatively short period of time, since the mirror passes the cleaning element at a constant speed.

Pursuant to a second specific embodiment of the present invention, the mirror-cleaning element can follow the sideview mirror in the transport direction. Although this embodiment requires a greater capital outlay, it increases the effectiveness of the mirror-cleaning element, since the latter becomes a follower. This embodiment is particularly suitable for the spray nozzle element for the washing process proper, in order in this manner to assure a very effective and thorough cleaning of the sideview mirror.

Pursuant to a further proposed feature of this second embodiment, the mirror-cleaning element is disposed at the free end of a lever arm, the other end of which, either at the upper or at the lower end of the cleaning mechanism, is pivotable about a shaft that extends transverse to the transport direction of the vehicle; a piston/-cylinder unit is disposed between the lever arm and the cleaning mechanism to effect this pivoting movement. A follower device is provided in a very straightforward manner by this lever arm. As a result of the circular arc described by the mirror-cleaning element, the difference in height relative to the various vehicles, and hence to the various sideview mirrors, is compensated for.

Pursuant to one advantageous further development of this type of follower device, it is proposed pursuant to a further feature of the present invention that the lever arm in order to allow the mirror-cleaning element to follow comprise two support arms that are freely rotatably mounted about fixed points, that between the free ends of the support arms, a similarly freely rotatable support member be disposed, and that the mirror-cleaning element be mounted on this support member. Due to the freely movable support arm and the support member, a parallelogram is formed that has the advantage that the mirror-cleaning element that is disposed on the support member retains its operative direction, with the latter not being changed in conformity to the circular arc course of the lever arm.

Pursuant to another preferred embodiment of the present invention, a non-contact scanning device is proposed that shifts the cleaning mechanism, together with the mirror-cleaning element, transverse to the transport direction of the vehicle in conformity with a specific predetermined distance from the sides of the vehicle that are moved to pass along the cleaning mechanism, whereby as the sideview mirror passes the cleaning mechanism, the mirror-cleaning element thereof bypasses the mirror. This non-contact scanning device has two advantages. On the one hand, the distance of the cleaning mechanism and the mirror-cleaning element relative to the vehicle can be optimally maintained without requiring, for example, spacer rollers that could damage the body or the sides of the vehicle. On the other hand, the non-contact scanning device has the advantage that the distance of the cleaning mechanism to the sides of the vehicle can be relatively small without the danger existing that the sideview mirror is in the path of movement, since the mirror is bypassed by the scanning device. After the sideview mirror has passed, the cleaning mechanism as well as the mirror-cleaning element return to a position where they are at a relatively small distance from the vehicle, so that a very effective cleaning of the mirror is possible by the mirror-cleaning element since then the operative direction of the latter can assume a very acute angle relative to the sides of the vehicle. In this case, the mirror-cleaning element supplies cleaning medium, such as water or air, at nearly right angles to the reflector or mirror surface of the sideview mirror, thus assuring a very good cleaning effect.

The non-contact scanning device preferably operates optically and, pursuant to a further feature of the present invention, is a light barrier unit, with photocells, that extends essentially parallel to the cleaning mechanism. The photocells comprise a light emitter as well as a light receiver.

Preferably, two light barrier units can be provided that are disposed one after the other transverse to the transport direction of the vehicle and that include appropriate photocells, with one of the light barrier units scanning the contour of the sides of the vehicle while the other light barrier unit scans the sideview mirror. By scanning the sideview mirror with the second light barrier unit, it is possible to control, for example, the supply of cleaning medium to the mirror-cleaning element.

Pursuant to a further embodiment of the present invention, it is proposed that a respective cleaning mechanism, each with a mirror-cleaning element, be disposed on each side of the washing line, with a scanning device for scanning the sideview mirror being provided on only one side, while the mirror-cleaning element on the other side can be controlled in conformity with this scanning. This embodiment proceeds from the assumption that a respective sideview mirror is disposed on each side of the vehicle, with each of these mirrors having to be cleaned. For this reason, each of the cleaning mechanisms on both sides of the washing line are provided with a mirror-cleaning element, with these cleaning mechanisms being disposed "at the same level", since not only the sideview mirror on the driver's side but also on the passenger side are disposed symmetrically relative to the longitudinal axis of the vehicle. With this embodiment, it is sufficient to have the scanning device scan only t he sideview mirror on the driver's side, with the sideview mirror on the passenger side then inventively being controlled in conformity with this scanning and following parallel t hereto. Thus, if a sideview mirror is mounted on the passenger side, it too will be cleaned. If no sideview mirror is mounted on the passenger side the mirror-cleaning element then sprays "into space". With this type of control, operation of the mirror-cleaning element is structurally simplified since only a single scanning device is required for scanning the sideview mirror on the driver's side.

It is proposed pursuant to a further development of the present invention that the transverse shifting mechanism for the cleaning mechanism include two support arms that are mounted at the same level and are freely rotatable about shafts that extend in the transport direction of the vehicle, that the lower ends of the support arms are similarly freely rotatably connected via an essentially horizontal support member, that the vertical cleaning mechanism be securely disposed on the forward end of the support member, and that a piston/cylinder unit be disposed between one of the support arms and the support member or the cleaning mechanism. A transverse shifting of the cleaning mechanism, together with the mirror-cleaning element, is possible in a straightforward manner with this parallelogram-like transverse shifting mechanism that is embodied in the form of a swing. This mechanism is quick enough in order to be able, for example, to reliably bypass the sideview mirror. The mechanism also assures that the cleaning mechanism as well as the mirror-cleaning element retain their vertical position.

Pursuant to another feature of the present invention it is proposed that the entire apparatus be suspended in a freely swinging manner on a support frame about a shaft that extends transverse to the transport direction of the vehicle. If the vehicle, due to some technical disruption, bumps against the apparatus, the latter can deflect in the transport direction of the vehicle due to the swinging suspension, so that worse damages are avoided. The transport mechanism can then be stopped by means of a switch, so that the vehicle advances no further.

The mirror-cleaning element can preferably be supplied with cleaning medium separate from the cleaning mechanism, with the mirror-cleaning element being adapted to have cleaning medium supplied thereto for a specified period of time after the element passes the sideview mirror. This has the advantage that the mirror-cleaning element is operated only when cleaning of the sideview mirror is possible, i.e. when the sideview mirror is in the effective region of the mirror-cleaning element. This saves both energy and water.

Further specific features of the present invention will be described in detail subsequently.

DESCRIPTION OF PREFERRED EMBODIMENTS

Referring now to the drawings in detail, FIGS. 1 to 4 illustrate a first exemplary embodiment of the inventive cleaning apparatus, with this apparatus being used for the actual washing process with high-pressure water. The second exemplary embodiment of the inventive cleaning apparatus illustrated in FIGS. 5 to 9 is used in the drying process and is thus disposed downstream of the washing apparatus of FIGS. 1 to 4 in the washing line.

The washing apparatus illustrated in FIGS. 1 to 4 comprises a support frame 1, with a respective one of these support frames actually being disposed on each side of the washing line. The upper end of the support frame 1 is provided with a horizontal crossbar 2. Two support arms 4, 4' are freely rotatably mounted on this crossbar 2 about shafts 3, 3' that are disposed in the transport direction of the washing line. The two lower ends of the support arms 4, 4' are in turn also freely rotatably connected, about shafts 5, 5', via a horizontal support member 6. Rigidly connected to the front end of this support member 6 is a nozzle rack 7. Disposed vertically on this nozzle rack 7 is a spray nozzle tube or holder 8. On that side directed toward the washing line, the spray nozzle holder 8 is provided with nozzles 9 through which the water for cleaning passes. In the illustrated embodiment, the spray nozzle holder 8 comprises three individual elements 10, 10', and 10", which are completely separate from one another and are also operated separately. Each element also has its own water feed lines, though these are not shown.

Figure 1:
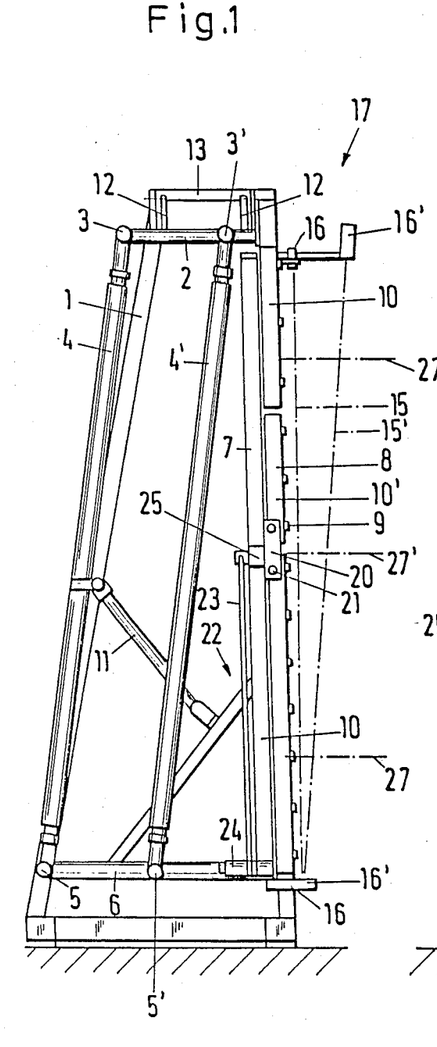
FIG. 1 is a view that shows a first exemplary embodiment of the inventive cleaning apparatus in the transport direction of the vehicle through the washing line, with the apparatus including a spray nozzle holder as well as a follower spray nozzle element.
Figure 3:
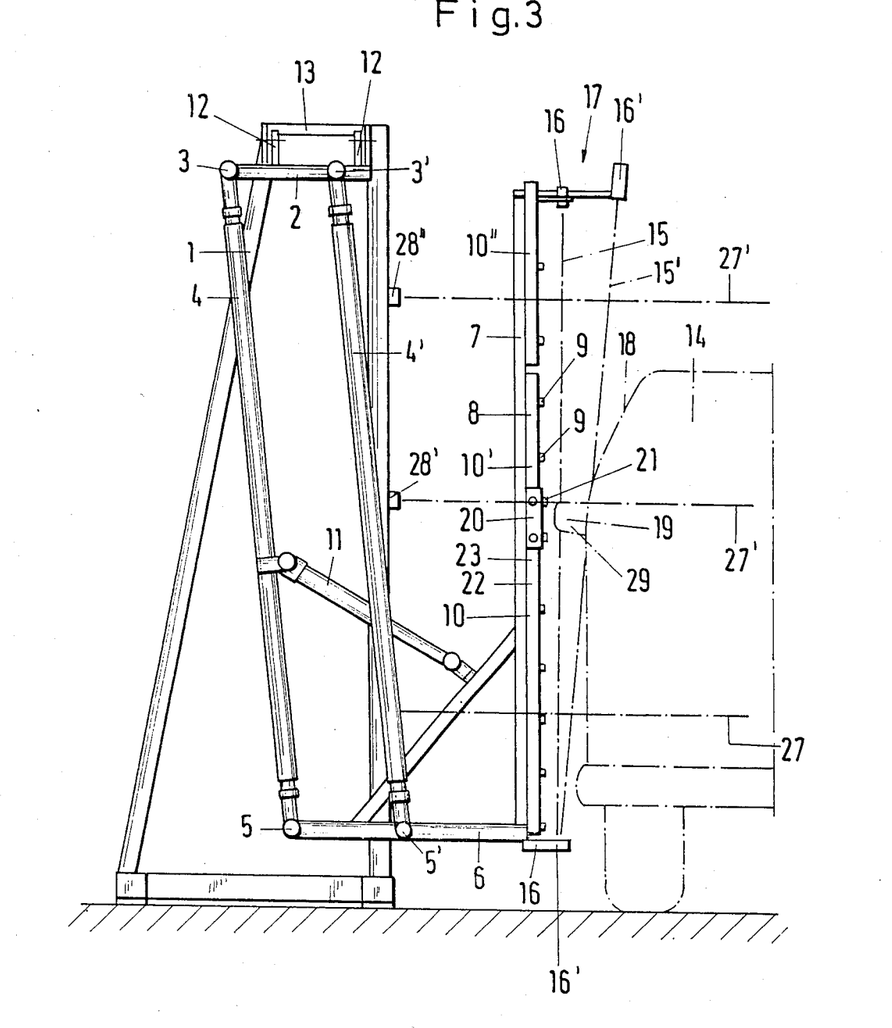
FIG. 3 is a view similar to that of FIG. 1 after a transverse shifting of the cleaning elements in the direction of the vehicle.

The crossbar 2, the two support arms 4, 4', as well as the support member 6 form a pivotable parallelogram, with the pivoting movement being effected transverse to the transport direction in the washing line, as can be seen from a comparison between FIGS. 1 and 3. A piston/cylinder unit 11 that is disposed between the support arm 4 and the nozzle rack 7 is used to effect this transverse movement. By actuating the piston/cylinder unit 11, a transverse movement from the position illustrated in FIG. 1 into the position illustrated in FIG. 3 is effected. Due to the parallelogram arrangement, the spray nozzle holder 8 receives its vertical position.

Figure 2:
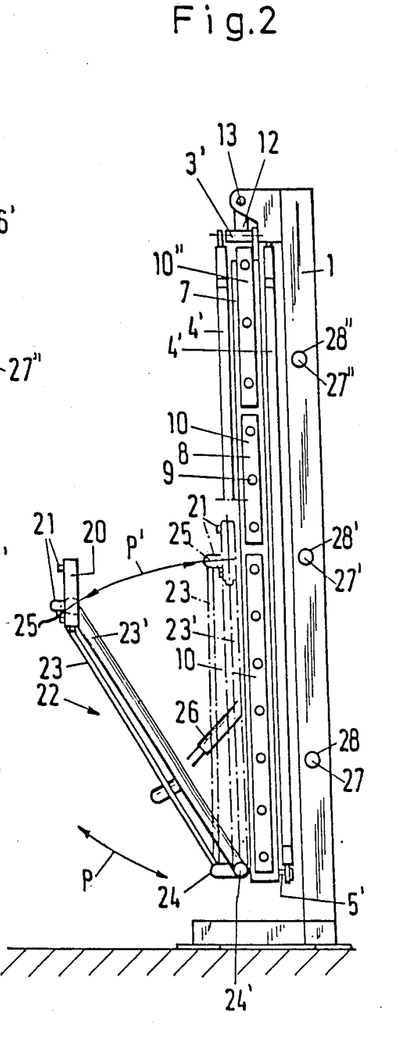
FIG. 2 is a view that shows the cleaning apparatus of FIG. 1 transverse to the transport direction of the vehicle along with a following spray nozzle element.

The upper crossbar 2 is suspended in a swinging manner, via supports 12, on a shaft 13 that extends transverse to the transport direction in the washing line, so that the direction of swing is disposed in this transport direction. If, due to a technical disruption, a vehicle 14 bumps against the washing apparatus, the latter can swing away in the direction of the arrow P, as indicated in FIG. 2. By means of a not illustrated switch, the transport mechanism in the washing line can then be stopped, so that the vehicle 14 also stops.

Two light barrier units 15, 15' having photocells 16, 16' that are embodied as light emitter and light receiver are used for the control of the transverse shifting device. These light barrier units 15, 15' form a scanning device 17 for the side 18 and the sideview mirror 19 of the vehicle 14 that is moving past. The two light barrier units 15, 15' are disposed essentially parallel to the spray nozzle holder 8, though the units 15, 15' form an acute angle relative to one another. The light barrier unit 15' determines the non-contact distance of the spray nozzle holder 8 from the side 18 of the vehicle 14. After the light barrier unit 15' has been interrupted, the piston/cylinder unit 11 is stopped, and thus the distance to the side 18 is maintained. The light barrier unit 15 detects the sideview mirror 19, as can be seen in FIG. 3. A more detailed description of this operation is provided subsequently.

The inventive washing apparatus also comprises a special washing apparatus for the sideview mirror 19 and includes a spray nozzle element 20 having two nozzles 21. This spray nozzle element 20 is disposed at the free end of a lever arm 22, which comprises two support arms 23, 23' that, at the lower end of the spray nozzle holder 8, are freely rotatably connected about shafts 24, 24'. The shafts 24, 24' are disposed in a direction transverse to the transport direction of the vehicle 14 in the washing line, so that the support arms 23, 23' are pivotable in this transport direction, as indicated by the arrow P'. The forward free ends of the support arms 23, 23' are also freely rotatably connected via a support member 25 to which the spray nozzle element 20 is securely connected. In this way, a parallelogram is formed via which the spray nozzle element 20 maintains its operative direction and always emits or radiates in the horizontal direction. Operation of the lever arm 22 is effected via a piston/cylinder unit 26 that is disposed between the support arm 23 and the nozzle rack 7.

Finally, the washing apparatus is provided with light barrier units 27, 27', and 27" that extend transversely over the transport section in the washing line. These light barrier units are provided with photocells 28, 28', and 28" and are disposed at various heights. The light barrier units 27, 27', and 27" extend from the support frame 1 on one side of the washing line to the support frame on the other side of the washing line, so that these light barrier units are completely disposed in the direction of movement of the vehicle 14. The light barrier units 27, 27', and 27" are used to control the individual elements 10, 10', and 10" of the spray nozzle holder 8.

Figure 4:
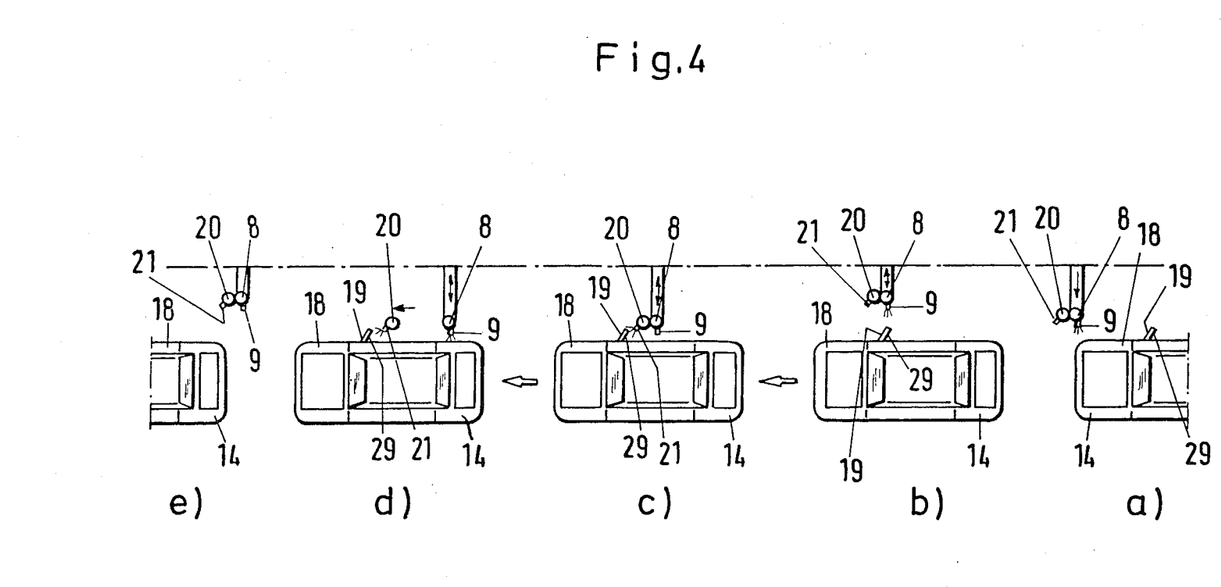
FIG. 4 is a view that shows the operation of the inventive cleaning apparatus in various stages (a to e)
Figure 5:
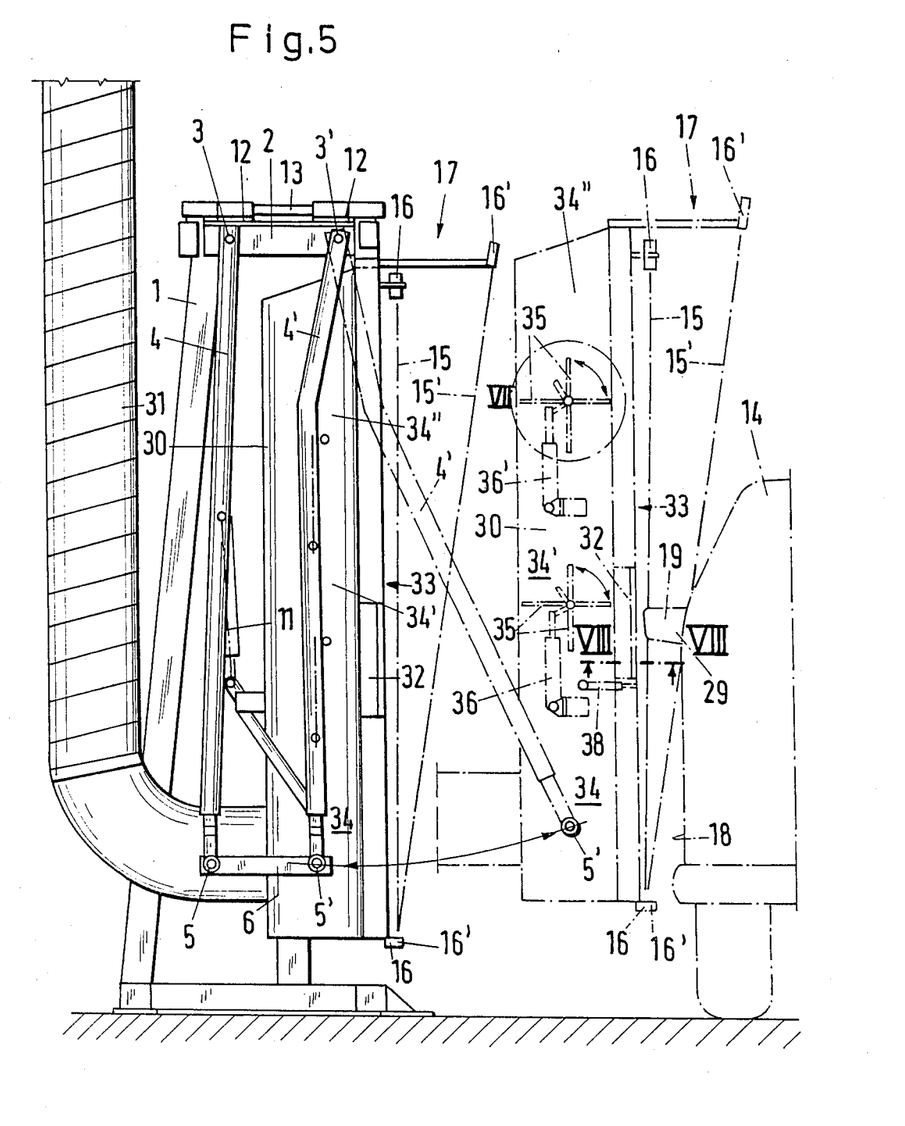
FIG. 5 is a view that shows a second exemplary embodiment of the inventive cleaning apparatus with a drying nozzle holder and a drying nozzle element for the sideview mirror, with the apparatus being shown before and after transverse shifting of the drying elements.
Figure 6:
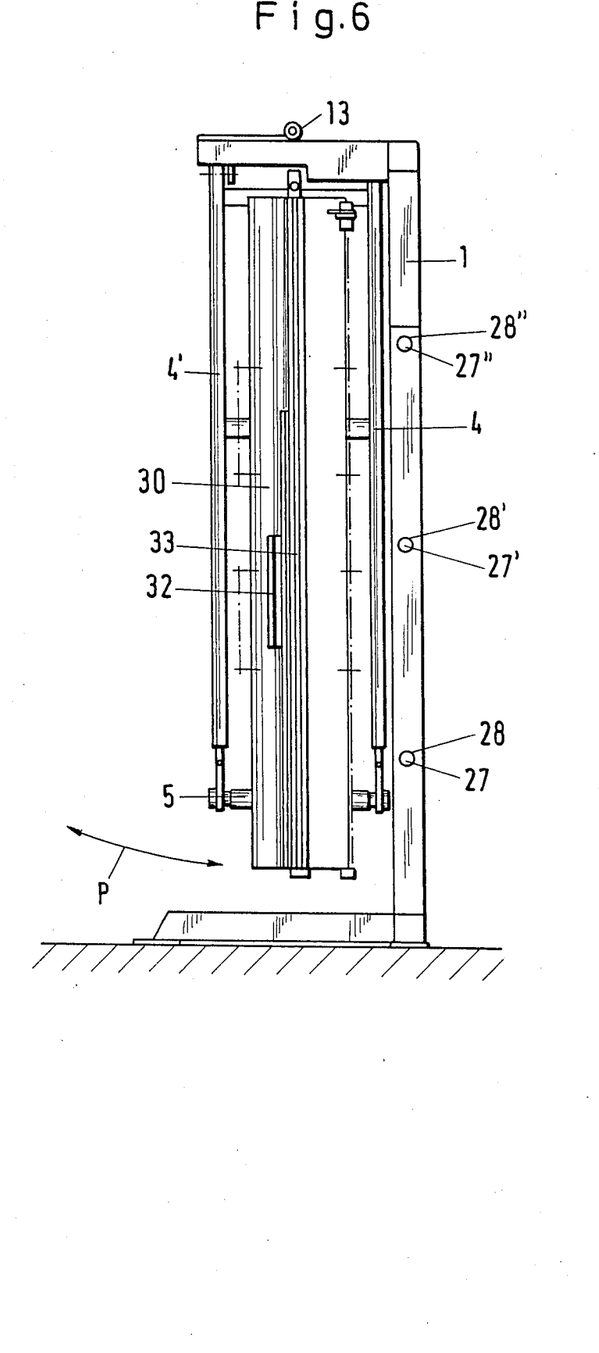
FIG. 6 is a view of the cleaning apparatus of FIG. 5 transverse to the transport direction of the vehicle.
Figure 7:
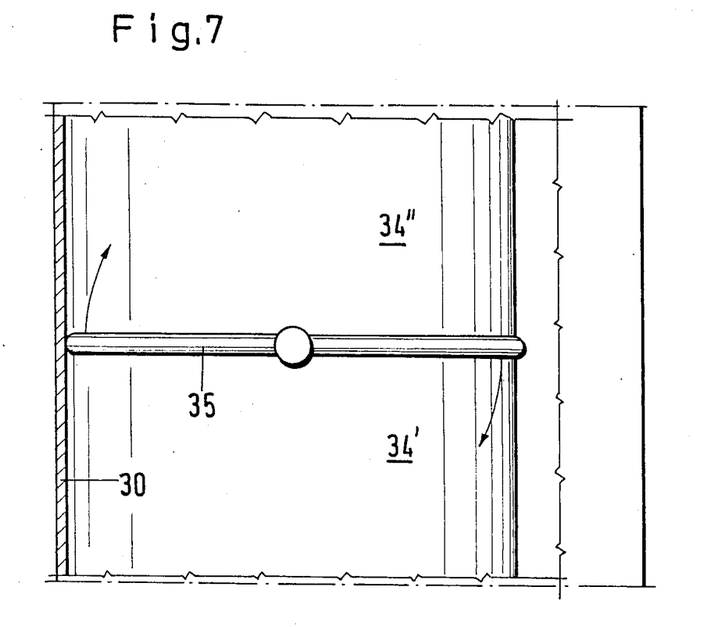
FIG. 7 is an enlarged view of the encircled portion VII in FIG. 5.
Figure 8:
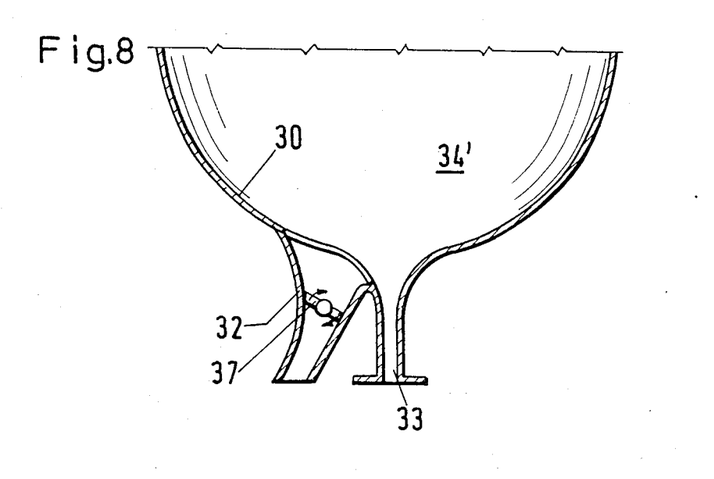
FIG. 8 is a cross-sectional view taken along the line VIII—VIII in FIG. 5.

The washing apparatus operates as follows (see FIG. 4):

In the starting position, the apparatus is in the retracted position (see also FIG. 4e). The approaching vehicle 14 interrupts the lowermost light barrier unit 27. This has a two fold effect. On the one hand, the spray nozzle holder 8 is moved inwardly transverse to the transport direction by the piston/cylinder unit 11 until the side 18 of the vehicle 14 interrupts the light barrier unit 15'. When this interruption occurs, the moving process is discontinued, so that the distance of the spray nozzle holder 8 to the vehicle 14 remains constant. On the other hand, the interruption of the light barrier unit 27 causes water to be supplied to the lower individual element 10 of the spray nozzle holder 8, thereby cleaning the front fender region all the way to the back end of the vehicle 14.

Two things happen in the region of the sideview mirror 19. On the one hand, the mirror 19 interrupts the light barrier unit 15, so that via the piston/cylinder unit 11 the spray nozzle holder 8 is briefly retracted (FIG. 4b) and bypasses the mirror 19, whereby behind the mirror 19 the spray nozzle holder 8 is again returned to the vehicle 14 (see FIG. 4c). At the same time, due to the interruption of the light barrier unit 15 the piston/cylinder unit 26 is activated, so that the lever arm 22 is pivoted in the transport direction of the vehicle 14 and gets behind the sideview mirror 19 (see FIG. 4d). At the same time, the water supply to the spray nozzle element 20 is opened and high-pressure water is supplied to the mirror surface 29 of the sideview mirror 19. The spray nozzle element 20 lags approximately 70 cm behind the sideview mirror 19, and in so doing passes through a circular arc, so that the height difference of various vehicles 14, and hence the various heights of the sideview mirrors 19, can be compensated for. By means of the following spray nozzle element 20, the dead corners behind the rear view mirror, which otherwise could not be reached, are cleaned very thoroughly.

The windshield of the vehicle 14 interrupts the light barrier unit 27'; this triggers the supply of water to the central individual element 10' of the spray nozzle holder 8. If the vehicle 14 is tall enough to interrupt the uppermost light barrier unit 27", water would also be supplied to the uppermost individual element 10" of the spray nozzle holder 8.

After the lever arm 22 with the spray nozzle element 20 has reached the end position, it pivots back into its starting position and the supply of water is discontinued. When the back end of the vehicle 14 has passed the lowermost light barrier unit 27, the spray nozzle holder 8 returns to its starting position (see FIG. 4e).

By dividing the spray nozzle holder 8 into three individual elements 10, 10', and 10", water is supplied only where needed. This saves both water and energy, which is particularly advantageous if the washing process uses hot water.

FIGS. 5 to 9 illustrate an appropriate drying apparatus having an appropriate transverse shifting mechanism. However, in place of the spray nozzle holder 8, a drying nozzle tube or holder 30 is provided that is connected via a hose 31 to a not illustrated fan or blower. Disposed in the central region of the drying nozzle holder 30 is a drying nozzle element 32 that is directed in the transport direction of the vehicle 14, as can be seen in the drawings, while the nozzle 33 of the drying nozzle holder 30 extends at right angles to the transport direction of the vehicle 14. However, in contrast to the spray nozzle element 20, the drying nozzle element 20 is rigidly disposed on the drying nozzle holder 30 without a follower device.

The drying nozzle holder 30 is divided into a total of three chambers 34 34', and 34". Two butterfly valves 35, 35', which are operated by piston/cylinder units 36, 36', serve as separating devices. A separate butterfly valve 37 having a corresponding piston/cylinder unit 38 is used to operate the drying nozzle element 32.

Figure 9:
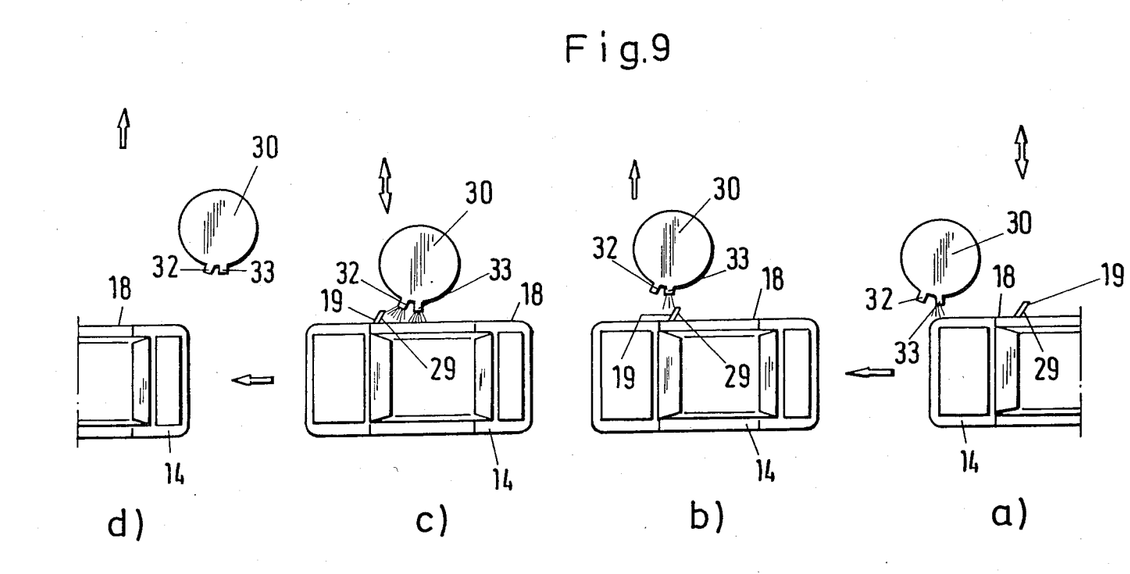
FIG. 9 is a view that shows the operation of the cleaning apparatus of FIGS. 5 and 6 in various stages (a to d).

The drying apparatus operates as follows (see FIGS. 9a to 9d):

The vehicle 14 interrupts the light barrier unit 27, whereupon the piston/cylinder unit 11 shifts the drying nozzle holder 30 in a direction toward the vehicle 14 (FIG. 9a). The shifting process is interrupted after the light barrier unit 15' is interrupted, so that the drying nozzle holder 30 is at a constant distance from the side 18 of the vehicle 14. At the same time, the blower is activated so that air flows into the lowermost chamber 34 of the drying nozzle holder 30 and exits via the nozzle 33. In the region of the sideview mirror 19, the light barrier unit 15 is interrupted, so that the drying nozzle holder 30 is retracted and bypasses the sideview mirror 19 (FIGS. 9b and 9c). At the same time, the butterfly valve 37 is opened for a certain period of time via the piston/cylinder unit 38 of the drying nozzle element 32, thus assuring a drying of the sideview mirror 19, especially in inaccessible areas.

The windshield of the vehicle 14 interrupts the middle light barrier unit 27', so that the butterfly valve 35 is opened via the piston/cylinder unit 36. In so doing, the air from below additionally flows out of the first chamber 34 into the second chamber 34', so that the region of the side windows of the vehicle 14 are also dried. If a taller vehicle 14 interrupts the uppermost light barrier unit 27", the upper butterfly valve 35' is also opened by the piston/cylinder unit 36, so that air is also supplied to the uppermost chamber 34", with this air exiting via the nozzle 33.

When the vehicle 14 again passes the lowermost light barrier unit 27, the drying nozzle holder 30 returns to its starting position (FIG. 9d).

This drying apparatus has a number of advantages. First of all, the distance of the drying nozzle holder 30 to the vehicle 14 can be optimally maintained without requiring spacer rollers. Via the light barrier units 15, 15', the sideview 19 of the vehicle 14 can be bypassed. Furthermore, the mirror 19 is dried better as a result of the drying nozzle element 32 that is directed in the transport direction of the vehicle 14. Finally, due to the fact that the drying nozzle holder 30 is divided into three chambers 34, 34', and 34", the airstream is conveyed only to where it is needed. Thus, for example, to drive the lower portion of the vehicle 14, the lowermost chamber 34 only is required. This brings about a great energy savings.

The present invention is, of course, in no way restricted to the specific disclosure of the specification and drawings, but also encompasses any modifications within the scope of the appended claims.

What we claim is:

1. An apparatus for cleaning a sideview mirror or mirrors of a vehicle in a washing line, including, to the side, a cleaning mechanism that essentially extends in a vertical direction, with the sides of the vehicle, along with said sideview mirror or mirrors thereof, being conveyed past said cleaning mechanism, said apparatus further comprising:
 a mirror-cleaning element that is disposed on said cleaning mechanism and is directed in a transport direction of said vehicle, said mirror-cleaning element, in the transport direction of said vehicle, being directed at a constant angle relative to a side of said vehicle into an angular region between said side and a sideview mirror mounted thereon.

2. An apparatus according to claim 1, in which said mirror-cleaning element is securely mounted on said cleaning mechanism.

3. An apparatus according to claim 1, in which said mirror-cleaning element is disposed on said cleaning mechanism in such a way that it can follow a sideview mirror in the transport direction of said vehicle as well as following for a predetermined distance along the washing line in an essentially constant spacing between said mirror-cleaning element and the sideview mirror.

4. An apparatus for cleaning a sideview mirror or mirrors of a vehicle in a washing line, including, to the side, a cleaning mechanism that essentially extends in a vertical direction, with the sides of the vehicle, along with said sideview mirror or mirrors thereof, being conveyed past said cleaning mechanism, said apparatus further comprising:
 a mirror-cleaning element that is disposed on said cleaning mechanism and is directed in a transport direction of said vehicle;
 said mirror-cleaning element being disposed on said cleaning mechanism in such a way that it can follow a sideview mirror in the transport direction of said vehicle;
 said cleaning mechanism having an upper and a lower end;
 a lever arm that has a first and second end, with said first end of said lever arm, at one of said ends of said cleaning mechanism, being pivotable about shaft means that extends transverse to the transport direction of said vehicle, and with said mirror-cleaning element being disposed at said second end of said lever arm; and
 a first piston-cylinder unit that is disposed between said lever arm and said cleaning mechanism.

5. An apparatus according to claim 4, in which said lever arm, in order to be able to follow a sideview mirror, includes two support arms, each with a first and second end, with said first ends being freely rotatably mounted about said shaft means, and with a support member being freely rotatably disposed between said second ends of said support arms; and in which said mirror-cleaning element is mounted on said support member.

6. An apparatus according to claim 4, which, in order to be able to bypass a sideview mirror when the latter passes by in the washing line, includes a non-contact scanning device to effect shifting of said cleaning mechanism, together with said mirror-cleaning element, transverse to the transport direction of said vehicle and in conformity with a specific predetermined distance form passing-by sides of said vehicle.

7. An apparatus according to claim 6, in which said scanning device is a light barrier means that has photocells and extends essentially parallel to said cleaning mechanism.

8. An apparatus according to claim 4, that is suspended, in a freely swinging manner, on a support frame about a shaft that extends transverse to the transport direction of said vehicle.

9. An apparatus according to claim 4, in which said mirror-cleaning element is adapted to receive cleaning medium separate form said cleaning mechanism.

10. An apparatus according to claim 9, in which said mirror-cleaning element is adapted to receive cleaning medium for a specified period of time after a sideview mirror passes by in the washing line.

11. An apparatus according to claim 4 in which said cleaning mechanism is a spray nozzle holder, and said mirror-cleaning element is a spray nozzle element.

12. An apparatus according to claim 4 in which said cleaning mechanism is a drying nozzle holder, and said mirror-cleaning element is a drying nozzle element.

13. An apparatus for cleaning a sideview mirror or mirrors of a vehicle in a washing line, including, to the side, a cleaning mechanism that essentially extends in a vertical direction, with the sides of the vehicle, along with said sideview mirror or mirrors thereof, being conveyed past said cleaning mechanism, said apparatus further comprising:
 a mirror-cleaning element that is disposed on said cleaning mechanism and is directed in a transport direction of said vehicle;
 which, in order to be able to bypass a sideview mirror when the latter passes by in the washing line, includes a non-contact scanning device to effect shifting of said cleaning mechanism, together with said mirror-cleaning element, transverse to the transport direction of said vehicle and in conformity with a specific predetermined distance from passing-by sides of said vehicle;
 said scanning device being a light barrier means that has photocells and extends essentially parallel to said cleaning mechanism; and
 said light barrier means comprises two light barrier units that are disposed one after the other transverse to the transport direction of said vehicle, and that each have appropriate photocells, with one of said light barrier units scanning the contour of a side of said vehicle, while the other light barrier unit scans a sideview mirror on that side.

14. An apparatus for cleaning a sideview mirror or mirrors of a vehicle in a washing line, including, to the side, a cleaning mechanism that essentially extends in a vertical direction, with the sides of the vehicle, along with said sideview mirror or mirrors thereof, being conveyed past said cleaning mechanism, said apparatus further comprising:
 a mirror-cleaning element that is disposed on said cleaning mechanism and is directed in a transport direction of said vehicle; and
 which, in order to be able to bypass a sideview mirror when the latter passes by in the washing line, includes a non-contact scanning device to effect shifting of said cleaning mechanism, together with said mirror-cleaning element, transverse to the transport direction of said vehicle and in conformity with a specific predetermined distance from passing-by sides of said vehicle, which includes, for said cleaning mechanism, a transverse shifting mechanism that includes two support arms that are mounted at the same level and are freely rotatable about shafts that extend in the transport direction of said vehicle; each of said support arms has a lower end, with these ends being freely rotatably connected to an essentially horizontal support member that has an end that projects from said support arms toward said vehicle and securely carries said vertical cleaning mechanism; and which includes a second piston/cylinder unit that is disposed between one of said support arms and either said support member or said cleaning mechanism.

15. An apparatus for cleaning a sideview mirror or mirrors of a vehicle in a washing line, including, to the side, a cleaning mechanism that essentially extends in a vertical direction, with the sides of the vehicle, along with said sideview mirror or mirrors thereof, being conveyed past said cleaning mechanism, said apparatus further comprising:

a mirror-cleaning element that is disposed on said cleaning mechanism and is directed in a transport direction of said vehicle; and which, in order to be able to bypass a sideview mirror when the latter passes by in the washing line, includes a non-contact scanning device to effect shifting of said cleaning mechanism, together with said mirror-cleaning element, transverse to the transport direction of said vehicle and in conformity with a specific predetermined distance from passing-by sides of said vehicle, which includes, on each side of said washing line, a respective one of said washing mechanisms, each with a mirror-cleaning element, with only one scanning device being provided on one side of said washing line to scan a sideview mirror on that side, with said mirror-cleaning element on the other side of said washing line being controlled in conformity with said scanning operation.

16. An apparatus according to claim 15, in which said mirror-cleaning element, in the transport direction of said vehicle, is directed at an angle relative to a side of said vehicle into the angular region between said side and a sideview mirror mounted thereon.

17. An apparatus according to claim 15, in which said mirror-cleaning element is securely mounted on said cleaning mechanism.

18. An apparatus according to claim 15, in which said mirror-cleaning element is disposed on said cleaning mechanism in such a way that it can follow a sideview mirror in the transport direction of said vehicle.

* * * * *